United States Patent [19]
Curtis

[11] 3,881,392
[45] May 6, 1975

[54] TENSION INDICATING FASTENER UNIT

[75] Inventor: Gary Martin Curtis, Elgin, Ill.

[73] Assignee: Illinois Tool Works Inc., Chicago, Ill.

[22] Filed: Jan. 28, 1974

[21] Appl. No.: 437,597

[52] U.S. Cl. .................................. 85/62; 151/35
[51] Int. Cl. ..................... F16b 31/02; F16b 39/24
[58] Field of Search ............. 85/62, 61; 151/35, 38, 151/37

[56] References Cited
UNITED STATES PATENTS

| | | | |
|---|---|---|---|
| 1,923,647 | 8/1933 | Vera | 151/37 |
| 2,151,919 | 3/1939 | Jacobson | 151/37 |
| 2,464,152 | 3/1949 | Ralston | 85/62 |
| 3,153,974 | 10/1964 | Canning | 85/62 |
| 3,474,701 | 10/1969 | Setzler | 85/62 |
| 3,476,010 | 11/1969 | Markey | 85/62 |
| 3,550,498 | 12/1970 | Briles | 85/1 JP |

*Primary Examiner*—Ramon S. Britts
*Attorney, Agent, or Firm*—Robert W. Beart; Thomas W. Buckman

[57] ABSTRACT

A tension indicating fastener unit which includes a conical spring washer assembled on a threaded fastener and a ring gauge assembled between the conical washer and the bearing surface of the threaded fastener. The ring gauge will include an inwardly projecting flange adapted to be pinched between the conical washer and the bearing surface of the fastener when the washer has been compressed a predetermined amount.

11 Claims, 11 Drawing Figures

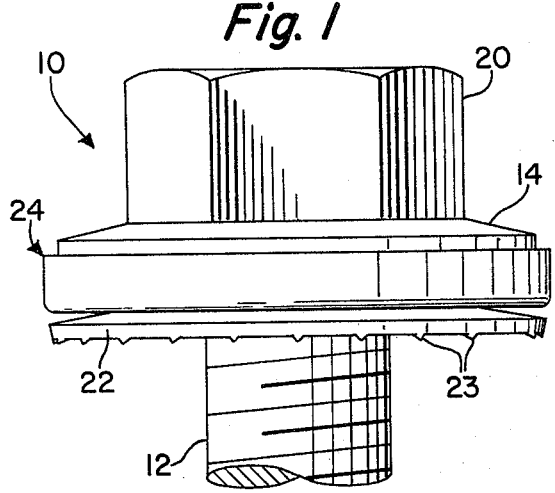
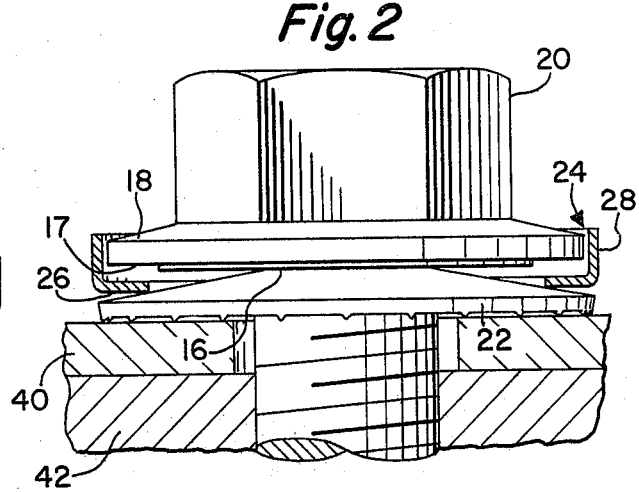
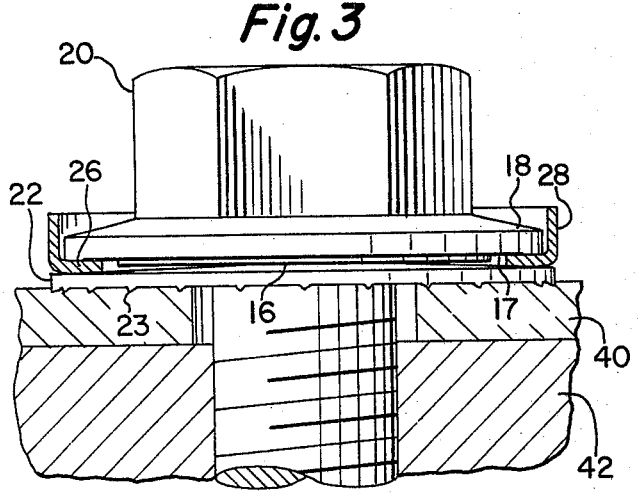
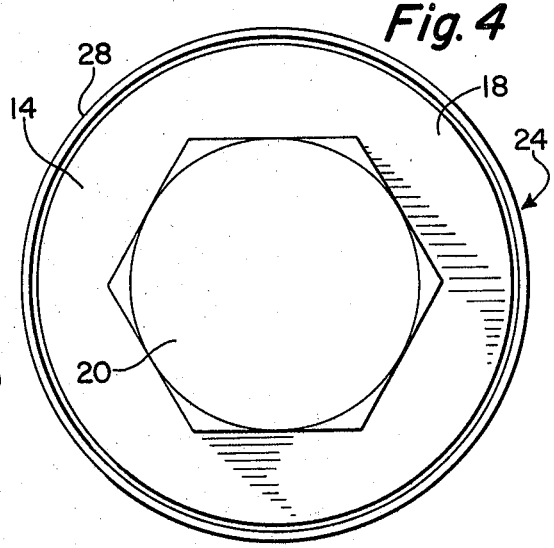
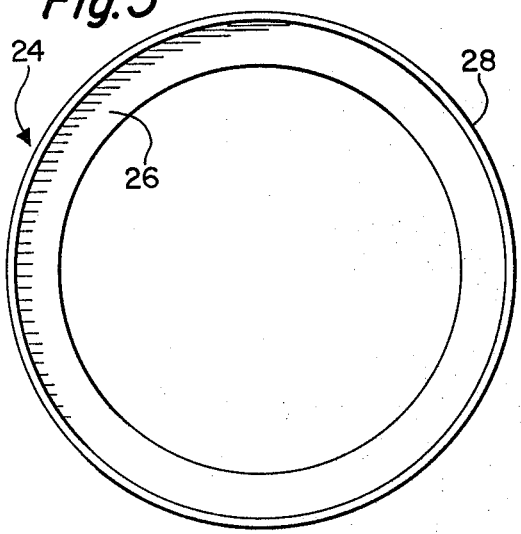
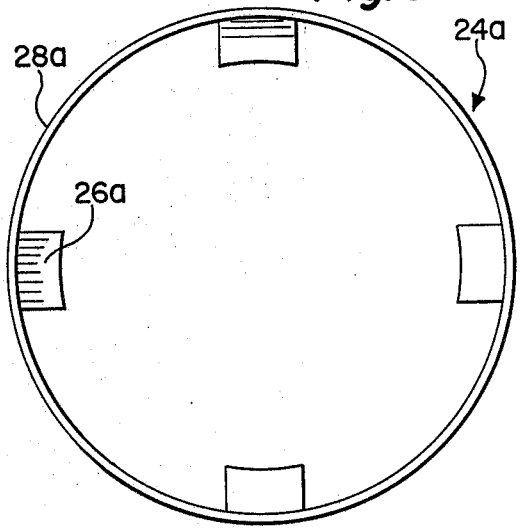

TENSION INDICATING FASTENER UNIT

The present invention relates generally to fastening devices and is more particularly concerned with devices which will function in a manner to automatically indicate the tension loads built up in the fastened joint.

It is frequently desirable in many applications to know the tension that is produced in a clamped joint and be apprised when tension in such joints reaches a predetermined amount. It is also frequently necessary to insure that the joint has not relaxed tension over a period of time even though the initial joint may have attained the predetermined tension.

Joints which incorporate a spring member are frequently used to maintain more consistent tension loads in a joint. However, such a spring member in a joint may also enhance the capability of a joint to relax tension under certain conditions.

There have been numerous attempts to identify the tension in a joint by measuring a more readily definable parameter, such as torque, used to seat the fastener. Since the actual tension produced in the joint is only roughly proportional to the torque, these methods have been found to be somewhat unreliable and inaccurate.

Other prior art methods of indicating tension in a joint utilize a portion or portions deformable at a certain tension, but such a system will not continue to police the joint to give an indication when the tension relaxes.

Accordingly, it is an object of the present invention to provide a fastening unit which will give an indication of the attainment of tension in a joint as well as give an indication if the tension has been relaxed any time after the attainment of the predetermined tension.

It is another object of the invention to provide a preassembled tension indicating unit which includes a spring member.

A further object of the invention is to provide a new improved fastener unit adapted to cooperate with an applicating tool so that an automatic indication of proper tightening is available.

An important advantage of the present invention is the provision of a preassembled unit including a conical-type spring washer and ring gauge which is capable of being easily and accurately assembled to indicate tension in the joint.

These and other objects and advantages are obtained by the present invention in which a threaded fastener, such as a bolt, is preassembled with a conical-type spring washer and a ring gauge interposed beneath the bearing surface of the bolt head and the upper surface of the conical washer. Flanges on the ring gauge are designed to extend inwardly a predetermined distance so that the axial compression of the spring washer will pinch the gauge between the washer and the bearing surface at a predetermined tension load. When the predetermined tension load is not present in the joint, the ring gauge will be free to rotate relative to the spring washer. In one embodiment, the gauge is free to rotate about the head of the threaded fastener unless the proper tension exists in the joint. Another embodiment preassembles the ring gauge about the periphery of the washer base of the fastener so that the ring gauge will normally rotate with the fastener until it is pinched between the washer and the bearing surface of the fastener. The ring gauge will include portions extended over the upper surface of the fastener. At the proper tension in the joint, further rotation of the threaded fastener will cause the rotary motion of the ring gauge to be retarded allowing an indicia to be exposed on the upper surface of the fastener. The ring gauge may be spring biased to return to its original position should the tension in the joint be relaxed.

The foregoing and other objects and advantages will become more apparent from the following detailed description when considered in connection with the accompanying drawings, wherein like reference numerals throughout the various views of the drawings are intended to designate similar elements of the components;

FIG. 1 is a side elevational view of a preferred embodiment of the tension indicating unit.

FIG. 2 is a side elevational view of the fastener unit, in partial section, prior to the attainment of a predetermined tension in a joint.

FIG. 3 is a side elevational view similar to FIG. 2 showing the ring gauge pinched between the spring washer and the bearing surface of the bolt when the proper predetermined tension has been attained in the joint.

FIG. 4 is a top view of the fastener unit shown in FIG. 2.

FIG. 5 is a top view of a preferred embodiment of the indicating gauge used in the present invention.

FIG. 6 is a top view of another embodiment of the indicating gauge used in the present invention.

Figure 7:
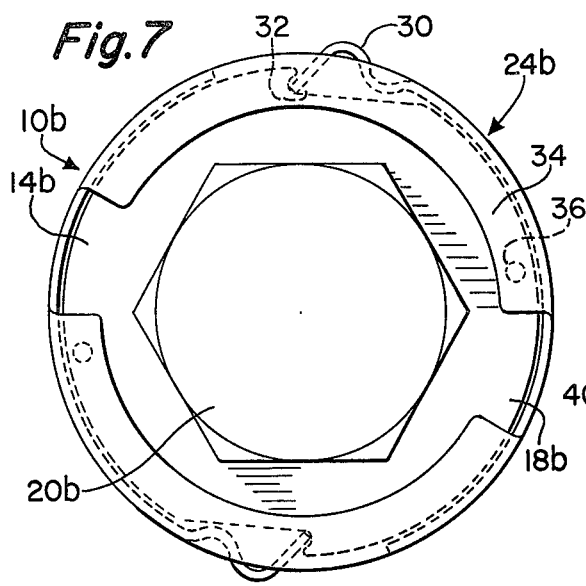
FIG. 7 is a top view of another embodiment of a tension indicating fastener unit in accordance with the present invention.

Referring now to the drawings and in particular FIGS. 1 and 2, it will be seen that a fastener unit 10 is provided which will include a threaded shank portion 12 and a driving head 20 with rotation inducing surfaces, such as a conventional hex head. The bolt 10 may conveniently be provided with an integral washer base 14. A spring washer, such as conical washer 22, is preassembled, according to conventional practices, beneath the bearing surface 16 of the washer base. A ring-like gauge 24 is also preassembled to the unit and will include a radially inwardly extending flange or rim portion 26 and upstanding side wall portions 28.

In operation, the fastener unit 10 is rotatively associated with workpieces 40 and 42 and may further include a nut member clamping the pair of workpieces or may include internally tapped threads in one of the workpieces, such as 42. As the bolt 10 is rotated, the locking barbs 23 on the undersurface of the washer 22 will bite into the workpiece to prevent the spring washer from rotating as the torque forces are applied to the joint. As the tension in the joint increases the washer 22 will compress, diminishing the axial gap between the bearing surface 16 and the upper marginal surface of the washer. When the joint has been loaded to the level of compression shown in FIG. 3, the flange 26 on the indicating gauge will be pinched between the bearing surface 16 and the upper surface of the conical washer, thereby preventing rotation between the gauge and the conical washer. In the preferred embodiment, the gauge 24 will be free to spin about the washer base 14 until the flange 26 is pinched. Thus, the lack of freedom of rotation of the ring 24 will indicate that a certain predetermined tension has been reached in the joint since the tension in the joint may be directly related to the compression of the conical washer 22.

It will be apparent that, utilizing the principles of this invention, the material thickness of the flange 26 and the radial extent thereof may be varied to indicate various levels of compression of the conical washer.

In order to reliably indicate the tension load using the present invention, the gauge 24 must be assembled on the bolt so that there will be a minimum of lateral movement of the ring relative to the axis of the fastener. Since the decrease in a circumferential axial gap is utilized as an indication of tension, the flange 26 should be retained concentric to the inner periphery of the conical washer. For this purpose, upstanding walls 28 surround the periphery of the washer base to locate and retain the gauge relative to the axis of the fastener and the conical washer. The inner diameter of the wall portion will correspond closely with the outer diameter of the washer base but will be slightly greater to allow the gauge to spin freely.

In the particular device illustrated, an annular peripheral recess 17 may be provided in the bearing surface 16 and the thickness of the flange 26 may be slightly greater than the depth of the recess to allow the gauge to be pinched at a tension level less than the tension level required for the complete flattening of the conical washer.

The spring washer 22 will permit the joint to be policed relative to the predetermined tension level. If the tension in the joint relaxes, the washer will tend to return to an uncompressed state. Upon relaxation to a tension level less than the predetermined tension level, the ring 24 will again be free to rotate thus indicating that the predetermined tension no longer exists in the joint.

In FIG. 6, an alternate embodiment of the gauge 24a is shown wherein circumferentially spaced inwardly extending tabs 26a are adapted to be interposed between the washer and the washer base and operate in a function similar to the continuous flange 26 described above relative to the preferred embodiment.

Figure 8:
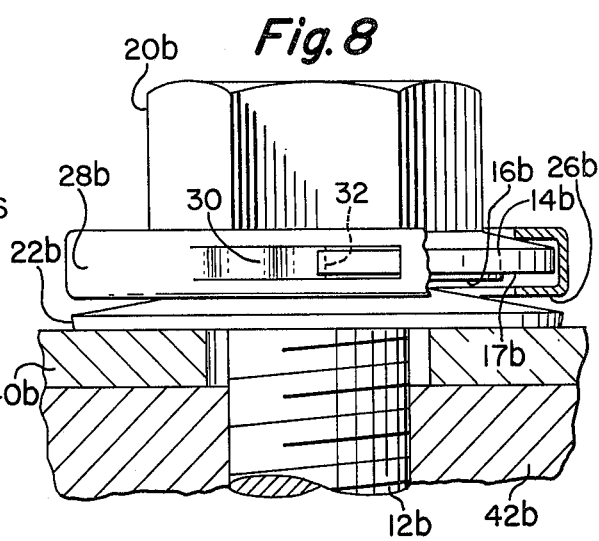
FIG. 8 is a side elevational view, in partial section, of the invention shown in FIG. 7 prior to the attainment of the predetermined tension in the joint.
Figure 9:
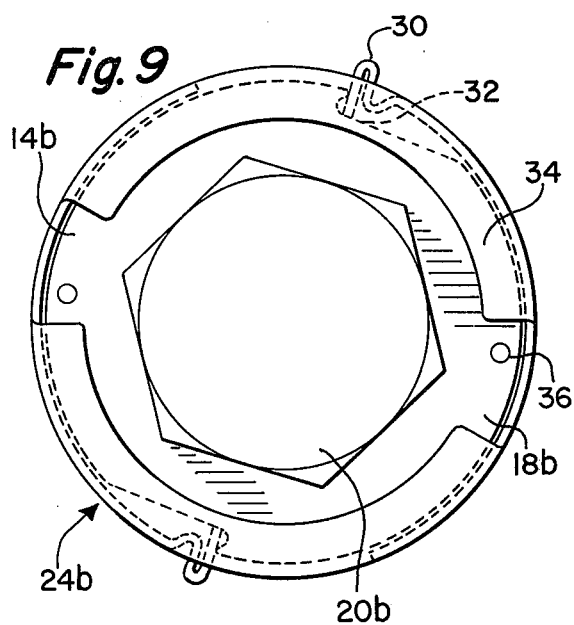
FIG. 9 is a top view, similar to the view of FIG. 7, but showing the fastener unit upon the attainment of a predetermined tension in the joint.

In keeping with the invention, another embodiment of a tension indicating fastener unit is shown in FIGS. 7-9. Fastener unit 10b is designed to give a visual indication of the attainment and maintenance of a predetermined tension load in a joint. Unit 10b will include a threaded fastening member 12b with an enlarged driving head 20b and generally circular washer base 14b. A conical spring washer member 22b may be preassembled to the unit and a tension indicating ring gauge 24b is provided with inwardly extending flange 26b positioned to be pinched between the bearing surface 16b and the upper surface of the washer 22b upon a predetermined compression of the washer. The indicating ring 24b is again provided with upstanding side walls 28b surrounding the periphery of the washer base 14b and adapted to locate and prevent lateral displacement of the flanges 26b relative to the axis of the fastener. However, the gauge 24b is retained from free rotation relative to the washer base through the use of spring arms 30 extending inwardly and registering in recesses 32 spaced about the periphery of the washer base. The gauge will rotate with the rotation of the washer base as torque is applied to the fastener. Cover flange portions 34 may also be formed on the gauge and adapted to overlie portions of upper marginal surface 18b of the washer base. Cover flanges 34 will normally overlie an indicia means 36 formed on the upper surface of the washer base. Upon compression of the washer 22b to a predetermined amount, the flange 26b will be pinched between the bearing surface 16b and the upper surface of the washer 22b in a manner similar to that described above relative to the preferred embodiment. When this pinching occurs, the indicating ring 24b will be substantially restrained from rotating with the threaded fastener and subsequent torgue applied to the fastener will cause the indicia 36 to move relative to the flange 34 exposing indicia as shown in FIG. 9.

The relaxation of tension in the joint may be indicated by slight rotation, under the bias of springs 30, of the indicating ring relative to the washer base covering up the indicia beneath flange 34, when flange 26b is no longer pinched.

Figure 10:
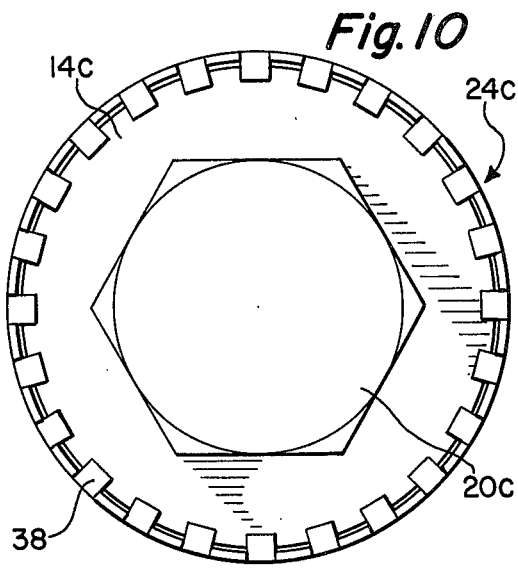
FIG. 10 is a top view of yet another embodiment of the preassembled tension indicating fastener unit.
Figure 11:
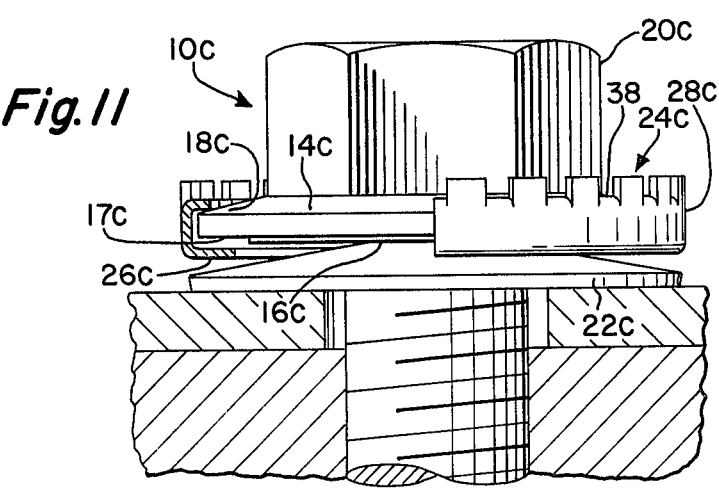
FIG. 11 is a side elevational view in partial section of the embodiment shown in FIG. 10 prior to the attainment of the predetermined tension in the joint.

FIGS. 10 and 11 show yet another embodiment of the invention wherein tabs 38 are formed inwardly from the wall portion 28c to aid in retaining and locating the ring gauge 24c as well as providing gaps in the wall to facilitate the association of a tool (not shown) which may sense the lack of freedom of rotation of the gauge and automatically restrict further torque from being applied to the joint.

Thus it is apparent that there has been provided in accordance with the invention a preassembled fastener unit that accurately indicates tension in a spring joint. While the invention has been described in conjunction with specific embodiments thereof, it is evident that many alternatives, modifications and variations will be apparent to those skilled in the art in light of the foregoing description. While the threaded fastener has been described principally as a bolt, it will be apparent that a preassembled nut unit may be used and still come within the spirit and scope of the invention. Likewise, a conical spring washer has been shown in all the embodiments but it will be apparent that this is only representative of the type of spring member that can be utilized in the invention and that any number of compressible spring members having an inner periphery raised from the outer periphery may be used within the intent of the invention.

Accordingly, it is intended to embrace all such alternatives, modifications and variations as fall within the spirit and broad scope of the appended claims.

I claim:

1. A preassembled tension indicating fastener unit comprising a rotary fastener member with rotation inducing surfaces, a generally circular bearing surface located beneath the rotation inducing surfaces and integral therewith, a conical-like spring washer device preassembled to the rotary fastener member, the washer device having an inner periphery spaced upwardly from its outer periphery, a generally circular indicating member preassembled to the unit and including a central aperture concentric with the outer periphery, the indicating member comprising radially inwardly extending flange means positioned between outer peripheral marginal portions of the bearing surface and the upper surface of the spring washer device, the inner periphery of the flange means being substantially equidistant from the axis of the fastener member and the spring washer device, side wall portions integral with the flange means extending upwardly therefrom surrounding the circular periphery of the bearing surface preventing lateral movement of the indicating member relative to the bearing surface and retaining the inner periphery of the flange means equidistant from the fastener and spring washer device axes, wherein the flange means is adapted to be pinched between said outer peripheral marginal portions of the bearing surface and the upper surface of the spring washer device as the spring washer device is compressed to a predetermined height which is directly related to a predetermined tension in the fastener unit.

2. A fastener unit in accordance with claim 1, wherein the flange means comprises a substantially continuous thin rim presenting an inner periphery concentric to the generally circular outer periphery formed by the wall portions.

3. A fastener unit in accordance with claim 1, wherein the generally circular bearing surface member includes upper and lower marginal surfaces extending radially outwardly of the rotation inducing surfaces.

4. A fastener unit in accordance with claim 1, wherein the bearing surface includes a marginal recess which receives the flange means.

5. A fastener unit in accordance with claim 1, wherein the bearing surface member includes upper and lower marginal surface portions and the indicating member includes portions extending radially inwardly from the wall portions above the upper marginal surface portion of the bearing surface member.

6. A fastener unit in accordance with claim 1, wherein the flange means comprises tab portions spaced circumferentially about the inner periphery of the indicating member.

7. A fastener member in accordance with claim 1, wherein the side wall portions of the indicating member include spring members extending inwardly and registering in notches in the periphery of the bearing surface member, upper flange portions extending inwardly from the side wall portions and juxtaposed over upper marginal surface portions on the bearing surface member, the upper marginal surface portions including indicia means which are covered by the upper flange portions, the upper flange portions including means for permitting the indicia means to be exposed upon relative rotation between the indicating member and the rotary fastener member, wherein the indicator member is adapted to rotate relative to the upper marginal surface portions against the bias of the spring members when the flange means is pinched between the bearing surface member and the spring washer member.

8. A fastener member in accordance with claim 1, wherein the diameter of the central aperture of the indicating member is greater than the diameter of the inner periphery of the washer device.

9. A tension indicating fastener unit comprising a threaded fastener member with a driving portion and bearing surface beneath the head integral therewith and having a generally circular outer periphery, a generally conical spring washer preassembled to the unit beneath the bearing surface, a ring gauge member preassembled on the unit and including upstanding wall surfaces surrounding the outer periphery of the bearing surface and conforming to the diameter thereof adapted to prohibit significant lateral movement of the gauge relative to the bearing surface, flange means integral with the wall surfaces and extending radially inwardly therefrom a predetermined distance, the flange means being located between the bearing surface and the conical spring washer, the innermost extremity of the flange means being equidistantly spaced radially from the washer aperture and retained in said equidistant relationship by the upstanding wall surface surrounding the outer periphery of the bearing surface, wherein the flange means may be pinched between the bearing surface and the upper surface of the washer as the tension in the fastener unit reaches a predetermined amount which is directly related to a predetermined compression of the conical spring washer.

10. A tension indicating fastener unit in accordance with claim 9, wherein the bearing surface extends generally perpendicularly to the axis of the fastener member and the conical washer is preassembled to the fastener member so that the outer periphery of the spring washer is spaced axially from the bearing surface wherein the flange means may rotate relative to the upper surface of the spring washer at all times when the axial compression of the spring washer is less than a predetermined amount.

11. A tension indication fastener unit in accordance with claim 9, wherein the spring washer includes means to lockingly engage a workpiece to prevent the washer from rotating relative to the workpiece.

* * * * *